United States Patent [19]
Shimizu et al.

[11] Patent Number: 5,506,724
[45] Date of Patent: Apr. 9, 1996

[54] GAIN CONTROLLABLE OPTICAL AMPLIFIER AND APPLICATIONS THEREOF

[75] Inventors: Katsuhiro Shimizu; Takashi Mizuochi; Kuniaki Motoshima; Tadayoshi Kitayama, all of Kanagawa, Japan

[73] Assignee: Mitsubishi Denki Kabushiki Kaisha, Tokyo, Japan

[21] Appl. No.: 309,921

[22] Filed: Sep. 21, 1994

[30] Foreign Application Priority Data

Oct. 25, 1993 [JP] Japan ..................... 5-266623

[51] Int. Cl.$^6$ ........................................ H01S 3/00
[52] U.S. Cl. ........................... 359/341; 359/337
[58] Field of Search ....................... 359/341, 337, 359/343; 372/6

[56] References Cited

U.S. PATENT DOCUMENTS

| | | | |
|---|---|---|---|
| 4,938,556 | 7/1990 | Digonnet et al. | 350/96.15 |
| 5,088,095 | 2/1992 | Zirngibl . | |
| 5,136,420 | 8/1992 | Inagaki et al. | 359/341 |
| 5,245,690 | 9/1993 | Aida et al. | 385/142 |
| 5,299,048 | 3/1994 | Suyama | 359/179 |
| 5,363,385 | 11/1994 | Heidemann | 372/6 |

FOREIGN PATENT DOCUMENTS 0395277  10/1990  European Pat. Off. .

OTHER PUBLICATIONS

E. Desurvire, et al "Dynamic Gain Compensation in Saturated Erbium–Doped Fiber Amplifiers" IEEE Photonics Technology Letters May, 1991.
"Automatic Gain Control in Cascaded Erbium–Doped Fibre Amplifer Systems" Electronics Letters, Jan. 1991.
Technical Digest OFC '91, Optical Fiber Communication Conference Feb. 1991.

*Primary Examiner*—Mark Hellner
*Attorney, Agent, or Firm*—Wolf, Greenfield & Sacks

[57] ABSTRACT

An optical fiber which amplifies an input signal by a pump source, a compensation-signal source which injects a compensation-signal propagating contra-directionally with respect to the input signal Into the optical fiber, a gain detector which measures a spontaneous emission light of the pump source at an input side of the optical fiber and a compensation-signal source controller which controls output of the compensation-signal source based on output of the gain detector are provided. In addition, a coupler and a wavelength selective reflector which reflects a light of the same wavelength as the compensation-signal selectively, are provided at the input side of the optical fiber.

47 Claims, 15 Drawing Sheets

GAIN CONTROLLABLE OPTICAL AMPLIFIER AND APPLICATIONS THEREOF

BACKGROUND OF THE INVENTION

1. Field of the Invention

This invention relates to a gain stabilizing system of an optical amplifier which is designed for amplification of input signal in a rare earth doped optical fiber.

2. Description of the Related Art

Regarding as the technique stated above, the configuration of FIG. 15 is described in the publication "Automatic Gain Control in Cascaded Erbium Doped Fiber Amplifier System", Electronics Letters, Vol. 27, No. 3, pp. 193–195, Jan. 31, 1991.

In FIG. 15, an input signal is entered through an input terminal 1 and input into a rare earth doped fiber 3 via a coupler 4a and a WDM (Wavelength Division Multiplexing) coupler 6. The input signal amplified at the rare earth doped fiber its input into a coupler 4b and output from an output terminal 2. A probe beam source 19 is modulated by an oscillator 20 and input into the rare earth doped fiber through the coupler 4a. Light power of the probe beam source 19 is locking-in detected by an optical receiver 10 connected to a coupler 4b. Supposing that a value of an output signal power of the probe beam source 19 is constant, a gain at the rare earth doped fiber can be known by the optical receiver 10. A pump-source driving circuit 21 controls an output signal power of a pump-source 8 based on the gain detected by the optical receiver 10. The output from the pump-source 8 is input into the rare earth doped fiber through the WDM coupler 6. An optical amplifier whose gain is stabilized can be obtained by operating the pump-source driving circuit 21 so as to make the gain at the rare earth doped fiber, detected by the optical receiver 10, be a constant value. Unused terminals of the coupler 4b and the WDM coupler 6 are reflectionless terminations 5a and 5b.

In the above gain stabilizing system, a probe beam must be used to detect the gain, which is superfluous for the system. Also, a wide dynamic range is needed for controlling the output of the pump-source. However, a signal-to-noise ratio (S/N) of the optical amplifier may deteriorate from changing the output signal power of the pump-source. In addition, since a semiconductor laser is usually used as the pump-source, an oscillation wavelength changes when the output signal power is changed, which enormously deteriorates a characteristic of the optical amplifier. Namely, the range of the input signal has had to be kept narrow.

Configuration of FIG. 16 shows an example of stabilizing the gain without changing the output of the pump-source. This example is reported in the thesis "IEEE Photonics Technology Letters" Vol.3, No. 5, 1991 in pages 453 to 455, entitled "Dynamic Gain Compensation in Saturated Erblum-Doped Fiber Amplifiers" by E. Desurivlre, et al.

In FIG. 16, the input signal enters through the input terminal 1, passes through the coupler 4a and the WDM coupler 6, and is amplified at the rare earth doped fiber 3. After passing the coupler 4b, the signal is output from the output terminal 2. The pump-source 8 is input into the rare earth doped fiber 3 through the WDM coupler 6. A part of the input signal amplified at the rare earth doped fiber 3 and a part of spontaneous emission light amplified at the rare earth doped fiber 3 are separated at the coupler 4b. Only the spontaneous emission light is transmitted through an optical filter 9. The output of the optical filter 9 is detected by the optical receiver 10. An optical modulator 22 is modulated by a compensation-signal controller 24 based upon the output from the optical receiver 10. An output signal from the optical modulator 22 is mixed with the input signal at the coupler 4a.

Since power of amplified-spontaneous-emission (ASE) is dependent on the gain of the optical amplifier, the gain of the optical amplifier can be known by detecting the power of the ASE. The gain of the optical amplifier is changed based on a total power of the input signal and the compensation-signal. Accordingly, the gain of the optical amplifier can be constant by controlling a change of the input signal and a power of the compensation-signal so as to make a detected ASE power constant. In this case, a dynamic range of the pump-source, that is a dynamic range of the gain of the optical amplifier, can be small by using the compensation-signal and no characteristic variation of the optical amplifier occurs. In FIG. 16, a configuration for controlling a general output and a temperature, for the pump-source is omitted.

In addition, it is known that an amplification level is controlled by separating a part of the ASE from an output signal amplified in an optical fiber, and feedbacking the separated ASE to an input side. FIG. 17 shows a configuration of the optical amplifier applying the above system disclosed in Unexamined Japanese Patent Publication Heisei 4-318526. The pump-source 8 and the optical filter 9 which makes some wavelength of the ASE pass selectively, are shown in FIG. 17.

Operation of the optical amplifier is as follows. A part of the ASE and a part of the input signal are taken out in the coupler 4a at an output side of the optical fiber and only the ASE is filtered at the optical filter 9. In this case, supposing that the input signal is decreased, the ASE is increased. The increased ASE from the optical filter 9 is returned to the optical fiber via the coupler 4b, so the amplification level of the optical amplifier is decreased, which keeps the output constant. Thus, a gain decrease can be obtained corresponding to the input decrease in a negative feedback loop.

Since the conventional optical amplifier is constructed as the above, when the dynamic range of the pump-source is extended based on a wide input signal dynamic range, the signal-to-noise ratio is deteriorated and an originated wavelength is changed in the configuration of the optical amplifier shown in FIG. 15. Accordingly, there has been a problem that only a narrow range input signal can be used.

In the configuration of the optical amplifier shown in FIG. 16, it is possible to make the dynamic range of the pump-source narrow even for a wide range input. However, in this case, it is necessary to separate the ASE from the input signal for control and a wavelength of the ASE must be different from that of the input signal. On the other hand, it is preferable for the wavelength of the ASE to be the same as the wavelength of the input signal since the ASE is detected in order to infer the gain. When the wavelength of the ASE and that of the input signal are different for the purpose of separating, control can not be executed correctly. In addition, since the propagating direction of the input signal and that of the compensation-signal are the same, it is difficult to separate the input signal from the compensation-signal and a transmission characteristic of the input signal is deteriorated since the input signal has a non-linear distortion when the compensation-signal is large.

In the configuration shown in FIG. 17, the input signal must be perfectly eliminated by the optical filter because the S/N of the output signal of the optical amplifier deteriorates enormously when the input signal is mixed in a feedback loop. However, it is difficult to perfectly eliminate the input signal, particularly when the wavelength of the input signal widely varies since the transparent wavelength of the optical filter must be changed depending upon the wavelength of the input signal. In addition, there is a possibility of oscillation when the output signal is used as a feedback source and input into the optical amplifier.

The present invention is for solving the above problems. It is an object of this invention to obtain a correct amplification level by using a pump-source and a compensation-signal source whose wavelengths are almost the same length as that of an input signal, even when the range of the input signal is wide, and to obtain an optical amplifier whose characteristic does not deteriorate. It is another object to obtain a system in which the optical amplifier is applied.

SUMMARY OF THE INVENTION

It is an object of the present invention to obtain an optical amplifier, wherein the characteristic deteriorates little and the gain changes little, even when an input signal range is wide.

It is another object of the present invention not to affect other optical amplifiers and other transmitter-receivers.

It is another object of the present invention to increase efficiency of a compensation-signal source.

It is another object of the present invention to decrease gain change of the optical amplifier.

It is another object of the present invention to stabilize the optical amplifier, even without a compensation-signal source.

It is another object of the present invention to stably amplify a light in a system in which wavelength or power of a signal changes.

It is another object of the present invention to obtain a gain controlling method of the optical amplifier wherein the gain changes a little.

According to one aspect of the present invention, an optical amplifier includes a rare earth doped fiber, a compensation-signal source, an optical receiver, and a compensation-signal controller. An input signal is amplified by a constant output of a pump-source propagating contra-directionally with respect to the input signal in the rare earth doped fiber. A wide dynamic range of input is available by using a compensation-signal source propagating contra-directionally with respect to the input signal and coupled with an output side of the rare earth doped fiber, and by using the constant output of the pump-source. The compensation-signal source compensates power of the input signal. An optical receiver coupled with an input sled of the rare earth doped fiber measures power of a propagating amplified-spontaneous-emission (ASE) generated by the pump-source in the rare earth doped fiber. The compensation-signal controller controls a power of the compensation-signal source by measuring the power of the ASE.

In addition, an optical isolator is also provided at the input side of the rare earth doped fiber.

Adding to the basic configuration, a coupler and a wavelength-selective reflector for reflecting at least a light of compensation-signal wavelength to the coupler selectively are provided at the input side of the rare earth doped fiber.

Adding to the basic configuration, the compensation-signal source is used for transmitting a monitor signal to another optical amplifier, and the compensation-signal source is modulated with the pump-source and the compensation-signal controller.

Adding to the basic configuration, a first wavelength detector for detecting a wavelength of the input signal, a second wavelength detector for detecting a wavelength of the compensation-signal, and a wavelength controller for controlling the wavelength of the compensation-signal detected by the second wavelength detector, to be a different wavelength from that of the input signal detected by the first wavelength detector, are also provided.

According to another aspect of the present invention, an optical amplifier includes an optical fiber for amplifying an input signal using a constant output of a pump-source propagating contra-directionally with respect to the input signal, a wavelength-selective reflector coupled with an input side of the optical fiber for reflecting a light having a specific wavelength of ASE, and an isolator connected at the input side of the optical fiber, when necessary.

According to another aspect of the present invention, an optical amplifier includes an optical fiber for amplifying input signal using a constant output of pump-source propagating contra-directionally with respect to the input signal, and an isolator connected at an input side of the optical fiber, when necessary. The optical amplifier also includes an attenuation controller for controlling attenuation of filtered power of ASE using a measured power of the input signal, and for charging the filtered power of the ASE to an output side of the optical fiber.

According to one aspect of a distribution system wherein an optical amplifier of the present invention is applied, a first optical coupler, the optical amplifier and a second optical coupler connected with output of the optical amplifier are included. The first optical coupler is used for mixing original input signals and distributing each of the signals. The optical amplifier in this case is connected to an output terminal of the first optical coupler or to a first optical fiber. The optical amplifier includes an optical fiber for amplifying an input signal using a constant output of pump-source, compensation-signal source propagating contra-directionally with respect to the input signal for compensating a power of the input signal, a gain detector or an optical receiver placed at an input side of a rare earth doped fiber for measuring a propagating ASE generated by the pump-source in the rare earth doped fiber, and a compensation-signal controller for controlling an output power of the compensation-signal source depending upon the output of the gain detector.

According to one aspect of a local area network (LAN) wherein an optical amplifier of the present invention is applied, a first optical coupler or a first optical fiber, the optical amplifier and a second optical coupler or a second optical fiber connected with output of the optical amplifier are included. The first optical coupler or the first optical fiber mixes and distributes a plurality of input signals. The optical amplifier, connected to the first optical coupler or the first optical fiber, in this case, includes an optical fiber for amplifying the input signal using a constant output of a pump-source, a compensation-signal source propagating contra-directionally with respect to the input signal for compensating a power of the input signal, a gain detector or optical receiver placed at an input side of a rare earth doped fiber for measuring a propagating ASE generated by the pump-source in the rare earth doped fiber, and a compensation-signal controller for controlling output power of the compensation-signal source depending upon the output of the gain detector.

A gain controlling method for controlling amplification of an optical amplifier according to the present invention includes the following steps. A ASE power measurement step for measuring a power of a propagating amplified-spontaneous-emission (ASE) at an input side of the optical fiber which amplifies an input signal using a pump-source. A controlled output computation step for defining a controlled output value based on a specific computational procedure using result in the above measuring step. A compensation-signal source control step for controlling power of a compensation-signal propagating contra-directionally with respect to the input signal based on a value in the above controlled output computation step, Injection amount of the compensation-signal is controlled based on a result of the measuring step.

A gain controlling method for controlling amplification of an optical amplifier according to the present invention includes the following steps. A ASE power measurement step for measuring a power of a propagating amplified-spontaneous-emission (ASE) generated by a pump-source at an input side of an optical fiber. An input signal measurement step for measuring power of input signal. An attenuation control step for controlling attenuation of the ASE based on a result of the input signal measuring step and for outputting the attenuated ASE to an output side of the optical fiber. Feedback amount of the ASE to the optical fiber is controlled based on a result of the input signal measuring step.

According to one aspect of an optical amplifier of the present invention, compensation-signal input into a rare earth doped fiber propagates contra-directionally with respect to input signal, a pump signal of a pump source is filtered at an input side of an optical fiber, and ASE, generated by the pump source in an optical fiber, is detected. Since the ASE propagating contra-directionally with respect to the input signal is measured, the input signal is not included in the ASE. Based on power of measured ASE, amplification level is monitored. Injection amount is controlled so that the amplification level can be constant. The compensation-signal is controlled in order to make a total of the input signal and the compensation-signal constant. The compensation-signal compensates the input signal in a wide dynamic range. Thus, output power of the pump signal is controlled to be constant.

Adding to the effect of the basic configuration, because of the isolator placed at the input side of the rare earth doped fiber, the pump-source and the compensation-signal source are not mixed into the previous optical amplifier and don't affect it.

Adding to the effect of the basic configuration, because of the reflector placed at the input side of the rare earth doped fiber, the compensation-signal source is recycled and the total of the input signal and the compensation-signal is controlled to be constant.

Adding to the effect of the basic configuration, the compensation-signal is modulated by the monitor signal and sent to a posterior amplifier.

Adding to the effect of the basic configuration, a value of the wavelength of the compensation-signal is controlled to be different from that of the input signal even when the wavelength of the input signal changes.

According to one aspect of an optical amplifier of the present invention, ASE is used as a compensation-signal.

According to one aspect of an optical amplifier of the present invention, ASE is used as a compensation-signal for a stable loop.

According to one aspect of a distribution system wherein an optical amplifier of the present invention is applied, signals are amplified stably even when a dynamic range of input signal power is wide and wavelength of the input signal is various.

According to one aspect of a LAN system wherein an optical amplifier of the present invention is applied, signals are amplified stably even when a dynamic range of input signal power is wide and a wavelength of the input signal is various.

According to one aspect of gain stabilizing method of an optical amplifier of the present invention, ASE is detected at an input side of an optical fiber without getting any effect of input signal and injection amount of a compensation-signal is defined based on the detected value. The compensation-signal is injected at an output side of the optical fiber to propagate contra-directionally with respect to the input signal.

According to one aspect of gain stabilizing method of an optical amplifier of the present invention, ASE is filtered at an input side of an optical fiber without getting any effect of input signal and amount of the ASE for a feedback loop is defined based on amount of the input signal. The defined ASE is returned from an output side of the optical fiber.

Since that the compensation-signal source is provided in addition to the pump source, the compensation-signal is injected contra-directionally with respect to the input signal and the compensation-signal is controlled based on a measured power of amplified spontaneous emission (ASE), an optical amplifier, wherein characteristic deteriorates Just a little and a gain changes only a little, can be obtained even when an input signal range is wide.

Since an isolator is provided, an optical amplifier is completely independent from other optical amplifiers and other transmitter-receivers.

Since a wavelength-selective reflector for the compensation-signal is provided, the compensation-signal source is able to be utilized in other way, which gives an effect of increasing an efficiency of the compensation-signal source.

In addition, since the compensation-signal source is modulated by other signal and the modulated signal is transmitted to other optical amplifiers and other transmitter-receivers, there is an effect of dispensing with a pilot signal generator for monitoring.

Since means for measuring a wavelength and controlling the wavelength are provided, controlling the compensation-signal is performed without getting any effect of input signal even when the optical amplifier is used in a system wherein a wavelength of the input signal is variable, which gives an effect of decreasing a gain change of the optical amplifier further.

Since a wavelength-selective reflector for reflecting the ASE selectively and returning the reflected light to an optical fiber is provided, there is an effect of performing a stabilization of the optical amplifier even when without the compensation-signal source.

Since the ASE is controlled and fed back based on power of the input signal, there is an effect of performing a stabilization of the optical amplifier even when without the compensation-signal source.

Since the optical amplifier, wherein the compensation-signal propagating contra-directionally with respect to the input signal is controlled based on the detected power of the ASE, is provided in a distribution system, there is an effect of amplifying the light stably even in the system wherein the wavelength or the power of the signal changes.

Since the optical amplifier, wherein the compensation-signal propagating contra-directionally with respect to the input signal is controlled based on the detected power of the ASE, is provided in a local network system (LAN), there is an effect of amplifying the light stably even in the system wherein the wavelength or the power of the signal changes.

Since a ASE power measurement step, a controlled output computation step and an injecting compensation-signal inverse direction step are provided as a gain controlling method of the optical amplifier, there is an effect of obtaining the gain controlling method of the optical amplifier wherein the gain changes a little.

Since an ASE power measurement step, an input signal measuring step and an ASE feedback amount controlling step are provided as a gain controlling method of the optical amplifier, there is an effect of obtaining the gain controlling method of the optical amplifier wherein the gain changes a little.

DETAILED DESCRIPTION OF PREFERRED EMBODIMENTS

Embodiment 1.

Figure 1:
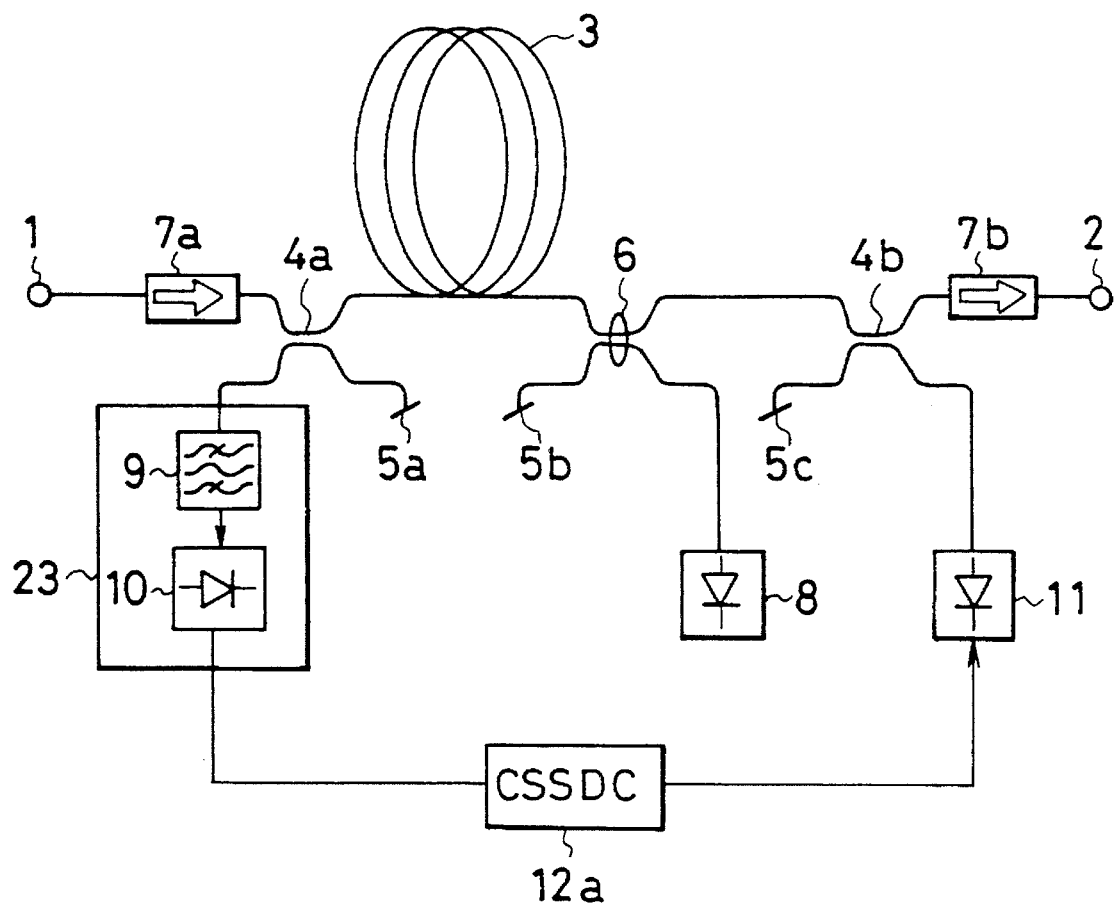
FIG. 1 shows a block diagram of the configuration of an optical amplifier according to one embodiment of the present invention.

FIG. 1 shows a block diagram of a configuration of an optical amplifier according to embodiment 1 of the present invention.

In FIG. 1, an input signal is entered through an input terminal 1 and output from an output terminal 2. The input signal, an amplified spontaneous emission (ASE) and a pump signal of a pump-source are separated at isolators 7a and 7b. Through a coupler 4a, the input signal is led into an rare earth doped fiber 3 and the ASE output from the rare earth doped fiber is input into an optical filter 9. A gain detector 23 is composed of the optical filter 9 and an optical receiver 10. The optical filter 9 shuts down a compensation-signal and selectively transmits all or part of the ASE. The ASE transmitted through the optical filter 9 is detected by the optical receiver 10. An output pump signal of a pump-source 8 is input into the rare earth doped fiber 3 through a WDM coupler 6. A compensation-signal source 11 is driven by a compensation-signal source driving circuit 12a based on an output from the optical receiver 10. An output signal of the compensation-signal source 11 is input into the rare earth doped fiber through a coupler 4b. Unused terminals of the couplers 4a, 4b and the WDM coupler 6 are reflectionless terminations 5a, 5b, and 5c.

Erbium-doped fiber is used as one example of the rare earth doped fiber for a signal of 1.55 micron band. In this case, 1.48 micron band, 0.98 micron band and such are suitable for the pump-source. Any wavelength within an amplified band of the rare earth doped fiber is acceptable for the compensation-signal source. The optical filter 9 filters a part of the ASE or all of the ASE. Any value of the band-pass characteristic of the optical filter 9 is acceptable as long as the wavelength of the band-pass characteristic is within a gain band of the rare earth doped fiber. In this case, it is necessary for the wavelength of the filtered light to be the same length as that of the signal in order to perform highly precise gain detection.

Operation of the optical amplifier will now be explained. A signal input through the input terminal 1 is passed via the isolator 7a and the coupler 4a, and amplified at the rare earth doped fiber 3. It is preferable for the pump-source to be driven with additional circuits for temperature stabilization and output power stabilization. By driving such a pump-source (driver not shown), a stabilized amplification level can be guaranteed. The ASE propagating co-directionally with respect to the pump signal and contra-directionally with respect to the input signal are generated in the rare earth doped fiber.

Figure 2:
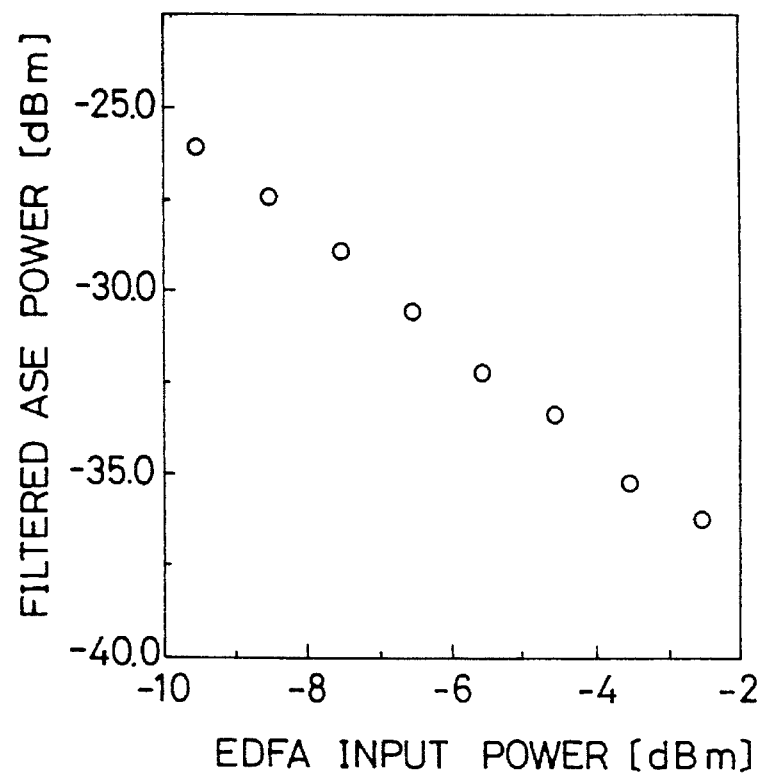
FIG. 2 illustrates a relation between power of input signal and power of amplified spontaneous emission to explain operation of FIG. 1.

Power of the generated ASE are defined based on power of the input signal. The higher the input signal power becomes, the lower the generated ASE power comes. A measured relation between the input signal power and the power of a ASE propagating contra-directionally with respect to the input signal at one erbium-doped fiber is shown in FIG. 2. However, the ASE is measured after being filtered selectively through an optical filter of 1 nm transmission band.

Figure 3:
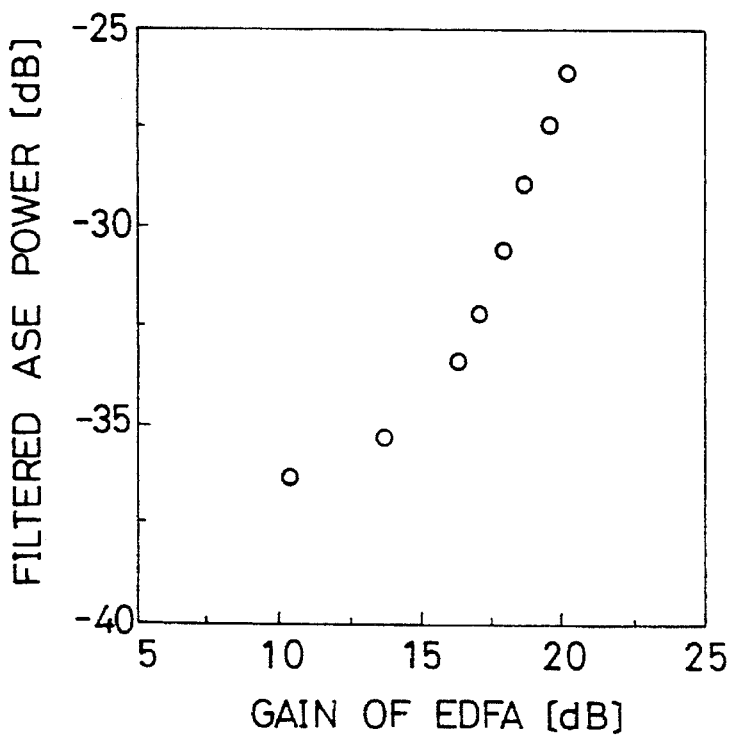
FIG. 3 illustrates a relation between a gain in a saturation region of an optical amplifier and power of amplified spontaneous emission to explain operation of FIG. 1.

In optical communication, the optical amplifier is often used in a saturation region. At the saturation region, a gain becomes low as the input signal power becomes high. Accordingly, a measured result of the relation between the gain of the optical amplifier and the power of the ASE in the saturation region is shown in FIG. 3. Thus, the gain of the optical amplifier can be known by measuring the power of the ASE.

In Embodiment 1, the ASE propagating contra-directionally with respect to the input signal is detected at the optical receiver 10 after passing through the coupler 4a and the optical filter 9. In this case, no input signal is mixed since the ASE propagates contra-directionally with respect to the input signal. By controlling the compensation-signal source 11 with the compensation-signal source driving circuit 12a in order to make the detected ASE constant, a total power of the input signal and the output signal of the compensation-signal source can be constant regardless of the power of the input signal. Since the output signal of the compensation-signal source is blocked by the isolator 7a, no compensation-signal leaks out of the optical amplifier, so the compensation-signal does not give any effect on a transmission fiber, other optical amplifiers, a transmitter-receiver and so on. When the total power of the input signal and the output signal of the compensation-signal source propagating contra-directionally with respect to the input signal is constant, the gain and a signal-to-noise ratio of the optical amplifier become constant, which realizes a gain stabilization. In a system where no leakage of the output of the compensation-signal source out of the optical amplifier occurs, the isolator 7a can be omitted. In addition, the isolator 7b, used for the system stabilization, can also be omitted if necessary.

It is also acceptable to use a ASE propagating co-directionally with respect to the input signal in order to detect the gain. However, in this case, an optical filter is necessary for separating the ASE from the input signal. It is also acceptable to use a polarizer to separate ASE from the input signal. Regarding as the way of pumping the input signal in the rare earth doped fiber, any of a co-directional pumping, a contra-directional pumping and a bi-directional pumping is acceptable.

Although it is possible to realize the gain stabilization by propagating the compensation-signal co-directionally with respect to the input signal, a problem that the compensation-signal is output into an output terminal breaks out as described above. In this case, it is acceptable to use an optical filter, which transmits only the input signal, for outputting, but it is difficult to use such an optical filter. Controlling the optical filter is needed in a system where the wavelength of the input signal is not constant. In addition, since the gain of the optical amplifier is changed by the power of the input signal, the power of the compensation-signal can be controlled by measuring the input signal power. However, in this case, there is a problem with stability of the control since it is not feedback control.
Embodiment 2.

Figure 4:
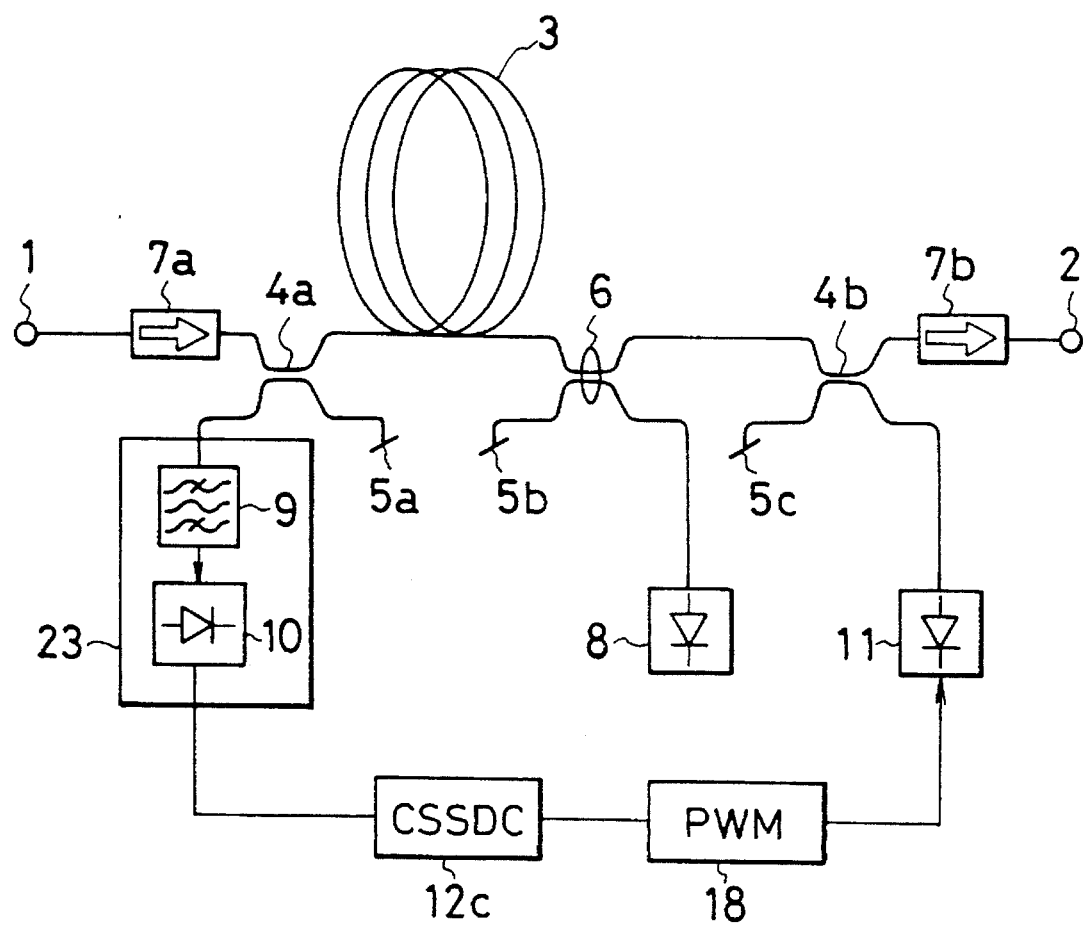
FIG. 4 shows a block diagram of configuration of an optical amplifier according to a second embodiment of the present invention.

FIG. 4 shows a block diagram of a configuration for another embodiment of the optical amplifier according to the present invention. The input signal is input through the input terminal 1 and output from the output terminal 2 via the isolator 7a, coupler 4a, rare earth doped fiber 3, WDM coupler 6, coupler 4b and isolator 7b.

A difference of this embodiment from Embodiment 1 is that a pulse width modulator 18 is applied. The compensation-signal source 11 is driven by a compensation-signal source driving circuit 12c and the pulse width modulator 18. The output of the compensation-signal source is input into the rare earth doped fiber 3 via the coupler 4b.

Operation of this embodiment is almost the same as that of Embodiment 1. The ASE propagating contra-directionally with respect to the input signal is passed through the coupler 4a and the optical filter 9 and detected at the optical receiver 10. By controlling the compensation-signal source 11 with the compensation-signal source driving circuit 12c and the pulse width modulator 18 in order to make the power of the detected ASE constant, it is possible to stabilize the gain. The compensation-signal source 11 is modulated in pulse width, which reduces electricity consumption.
Embodiment 3.

Figure 5:
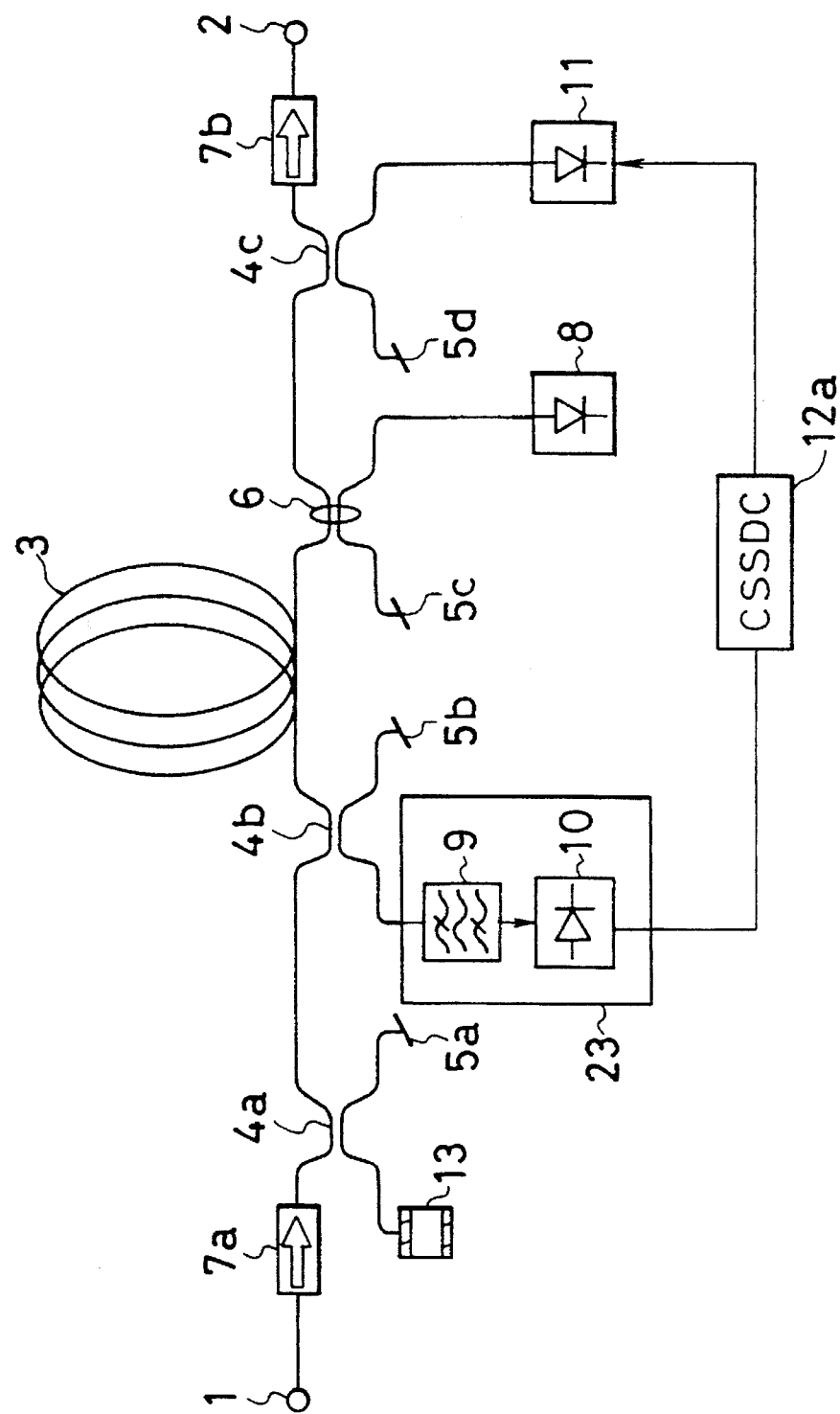
FIG. 5 shows a block diagram of configuration of an optical amplifier according to a third embodiment of the present invention.

FIG. 5 shows a block diagram of a configuration for another embodiment of the optical amplifier of the present invention. In FIG. 5, the configuration regarding as a route from inputting the input signal to outputting it and the operation are the same as those of Embodiment 1 shown in FIG. 1. A basic configuration and a basic operation of the control circuit of the compensation-signal in FIG. 5 are the same as those in FIG. 1. A difference in the configuration of this embodiment from that of FIG. 1 is that a wavelength-selective reflector 13 and a coupler 4a for the wavelength-selective reflector are provided. Unused terminals of the couplers 4a, 4b, 4c and the WDM coupler 6 are reflection-less terminations 5a, 5b, 5c and 5d. The wavelength-selective reflector 13 selectively reflects the wavelength of the output signal of the compensation-signal source. A Fabry-Perot resonator and such can be used as the wavelength-selective reflector, for instance.

Operation of this embodiment is the same as that of Embodiment 1. Namely, the ASE propagating contra-directionally with respect to the input signal is measured and the compensation-signal source 11 is controlled in order to make the power of the ASE constant.

In this configuration, the compensation-signal propagates contra-directionally with respect to the input signal and is amplified in the rare earth doped fiber 3. After being amplified, the compensation-signal is reflected partially by the wavelength-selective reflector and input into the rare earth doped fiber again. Thus, it is acceptable that the power of the output of the compensation-signal source 11 is small. It is possible to choose a value for a fork ratio of the coupler 4c which makes a transmittance of the input signal high and a connection efficiency of the compensation-signal small.
Embodiment 4.

Figure 6:
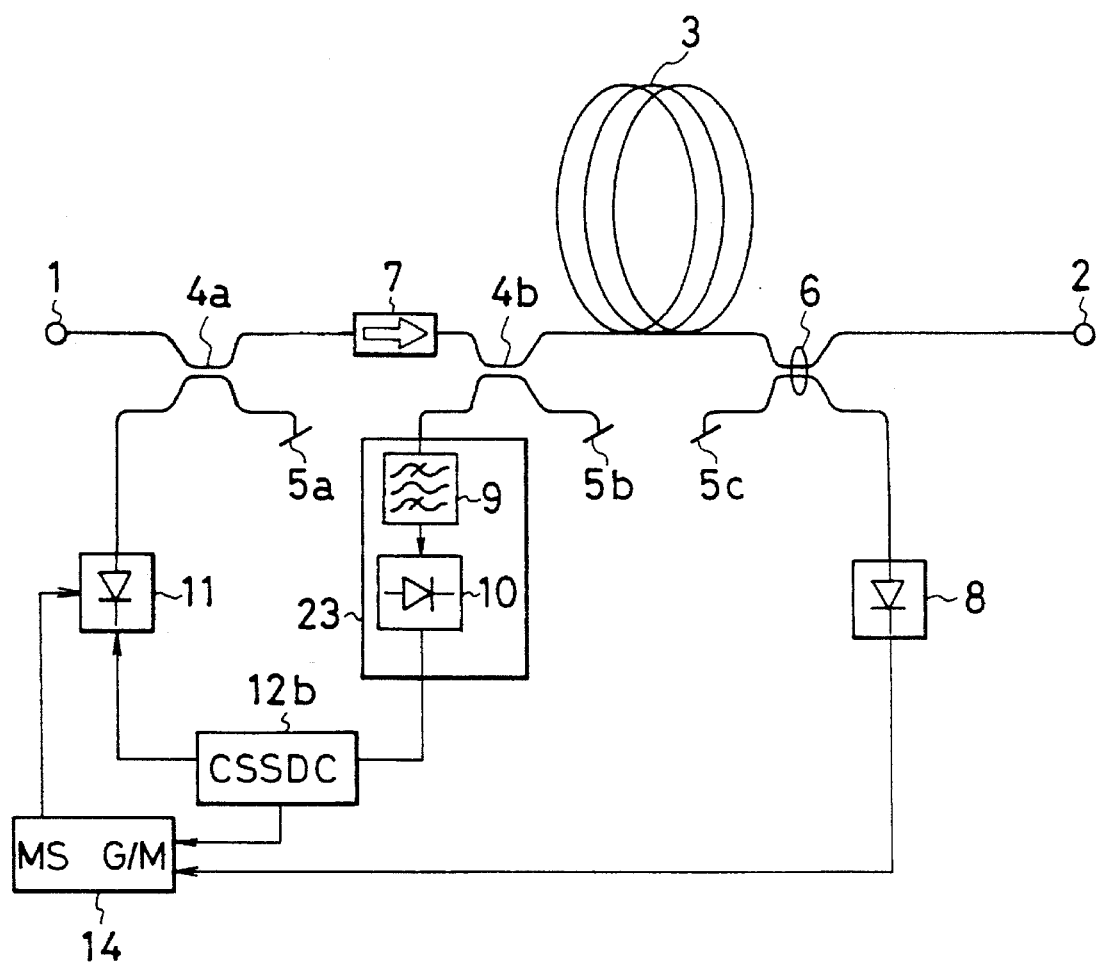
FIG. 6 shows a block diagram of configuration of an optical amplifier according to a fourth embodiment of the present invention.

FIG. 6 shows a block diagram of a configuration for another embodiment of the optical amplifier of the present invention. In FIG. 6, the configuration regarding as a route of the input signal and the operation are the same as those in FIG. 1. Although the direction of a flow of the configuration for generating and controlling the compensation-signal is opposite of that in FIG. 1, operation is almost the same as that of FIG. 1.

A difference in the configuration of this embodiment from that shown in FIG. 1 is that a monitor signal generator/modulator 14 is added. Power from the pump-source 8 and a gain signal from a compensation-signal source driving circuit 12b are input into the monitor signal generator/modulator 14. The output from the monitor signal generator/modulator 14 modulates the compensation-signal source by using these input signals as a monitor signal and a alarm signal.

The ASE propagating contra-directionally with respect to the input signal is detected at the optical receiver 10 and the compensation-signal source 11 is controlled to make the power of the ASE constant, which stabilizes the gain.

The output of the compensation-signal source as modulated by the monitor signal is output from the output terminal 2 with the input signal. Accordingly, other optical amplifiers, a repeater, or an optical receiver which is connected next to the optical amplifier according to this embodiment can receive the monitor signal. Therefore, it is possible to omit another signal source for monitoring by combining a role of the monitor signal with the compensation-signal.

It is also acceptable that the compensation-signal propagates contra-directionally with respect to the input signal. The configuration in this case resembles that of FIG. 1. The monitor signal is transmitted to another optical amplifier, a repeater, or an optical receiver which is connected previous to the optical amplifier. In this case, an isolator connected to the input terminal is not necessary. Modulation degree of the monitor signal combined to the compensation-signal is controlled based on the power of the compensation-signal, if necessary.

Embodiment 5.

Figure 7:
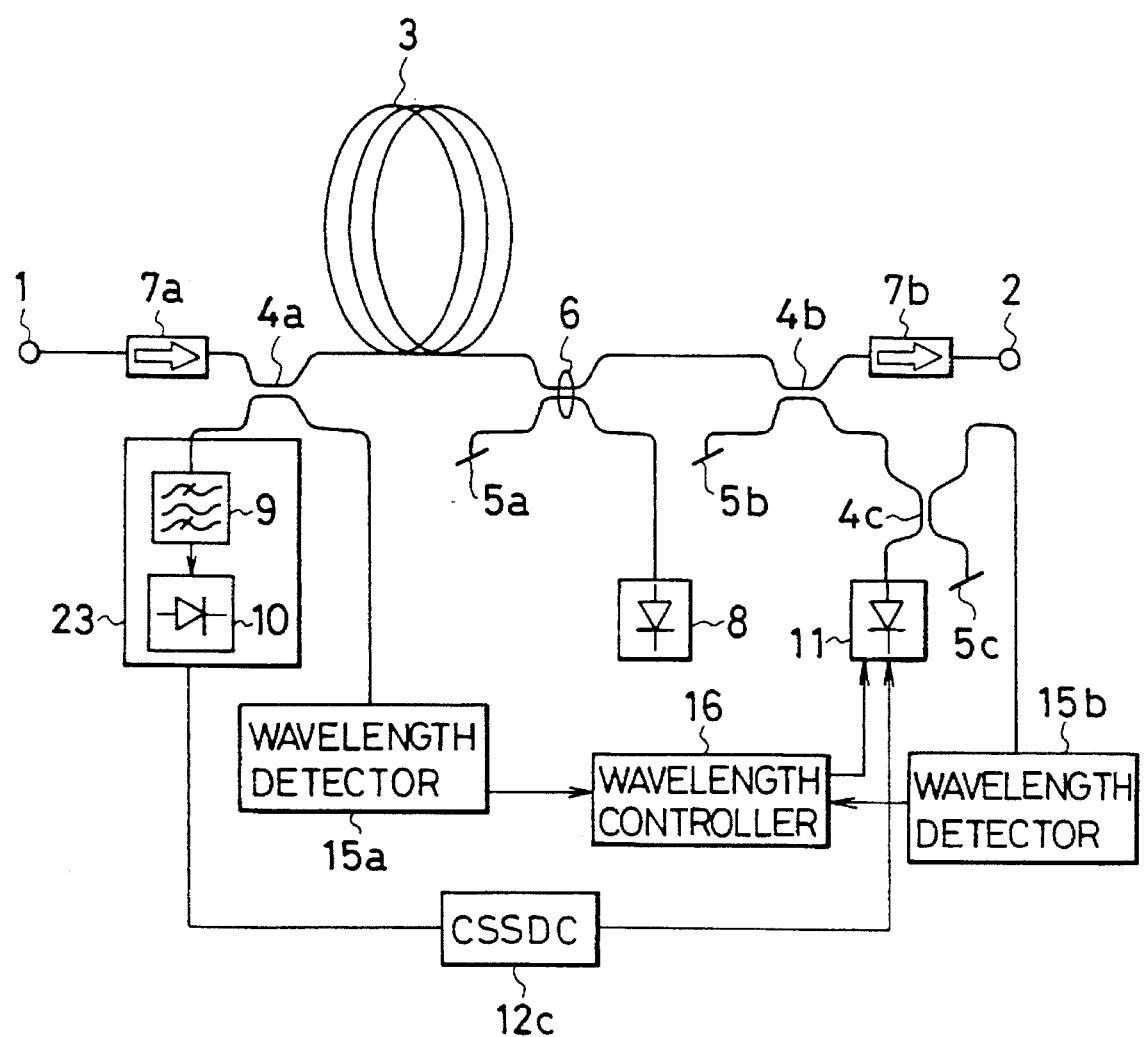
FIG. 7 shows a block diagram of configuration of an optical amplifier according to a fifth embodiment of the present invention.
Figure 8:
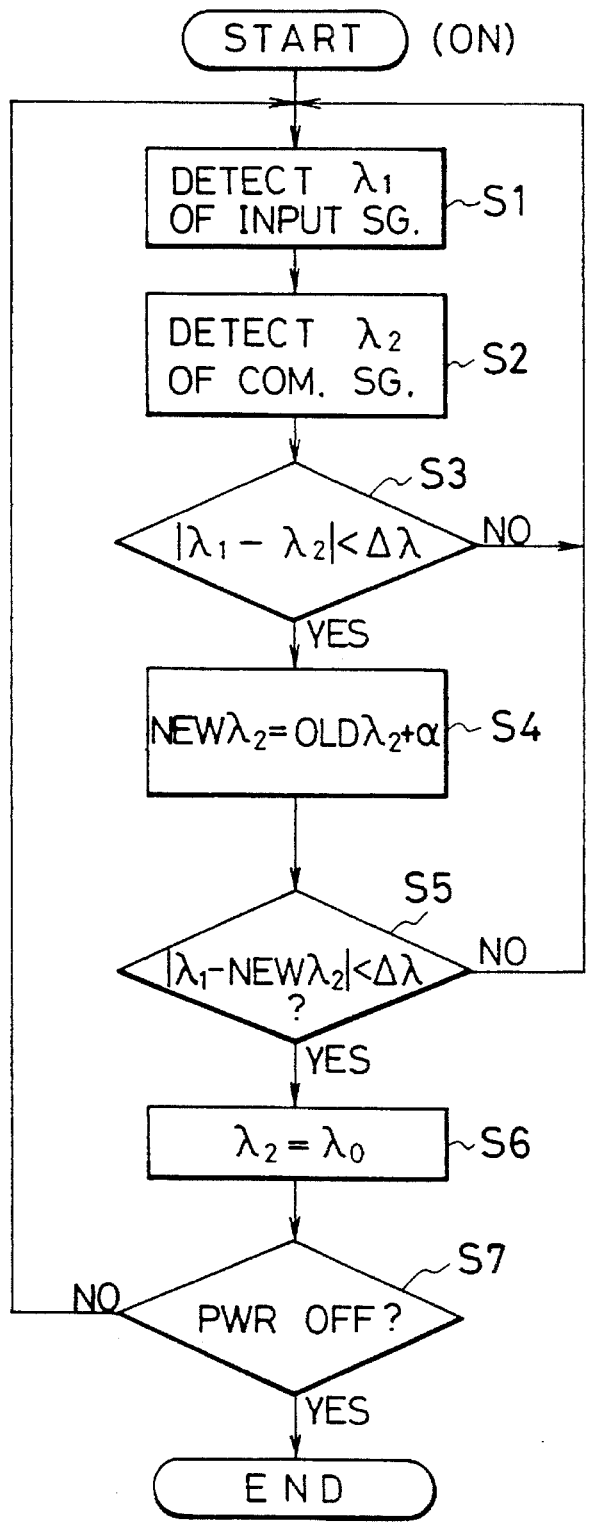
FIG. 8 shows a flowchart of operation a wavelength detector and a wavelength controller shown in FIG. 7.

FIG. 7 shows a block diagram of a configuration for a fifth embodiment of the optical amplifier of the present invention. In FIG. 7, the configuration regarding as the route of the input signal and the operation are the same as those in FIG. 1. Configuration for generating and controlling the compensation-signal is also the same as that of FIG. 1. A difference in configuration of this embodiment from the configuration shown in FIG. 1 is that a wavelength controller 16 and wavelength detectors 15a and 15b for the controller 16 are added. FIG. 8 is a flowchart showing operation of the wavelength controller 16.

As shown in FIG. 7, wavelength of the input signal is detected by a first wavelength detector 15a connected to the coupler 4a. Wavelength of the compensation-signal is detected by a second wavelength detector 15b connected to the coupler 4c. Wavelength of the compensation-signal source 11 is controlled by the wavelength controller 16. Unused terminals of the coupler 4b and the WDM coupler 6 are reflectionless terminations 5a and 5b.

Regarding as operation, controlling operations of the input signal and the compensation-signal in this embodiment are the same as those of the other embodiments. A new point is that the wavelength detectors 15a and 15b are applied. The wavelength of the input signal is detected by the wavelength detector 15a and the wavelength of the compensation-signal is detected by the wavelength detector 15b. The wavelength of the compensation-signal source 11 is controlled to be different from that of the input signal by the wavelength controller 16 based on operation according to the flowchart of FIG. 8.

Comparing a wavelength $\lambda_1$ of the input signal with a wavelength $\lambda_2$ of the compensation-signal, an absolute value of a deviation between the $\lambda_1$ and the $\lambda_2$ is to be more than or equal to $\Delta\lambda$. When the absolute value of the deviation is more than the specific value $\Delta\lambda$, the flow from a step S1 to a step S3 of FIG. 8 is repeated. The $\lambda_2$ of the compensation-signal is controlled to always have such a deviation when the $\lambda_2$ is compared with the $\lambda 1$. Thus, since the wavelength of the input signal never becomes the same as that of the compensation-signal even when the wavelength of the input signal changes, the compensation-signal does not affect the input signal.

The wavelength $\lambda_1$ of the input signal is detected at the step S1 and the wavelength $\lambda_2$ of the compensation-signal is detected at a step S2. The wavelength deviation of the two, $\lambda_1-\lambda_2$, is measured whether the difference is more than the specific value $\Delta\lambda$ or less than it, at the step S3. When the wavelength difference is more than the specific value $\Delta\lambda$, the flow of FIG. 8 shows that controlling operations repeat again from the step 1 and the controlling and the detecting is continued. When the wavelength deviation is less than the specific value $\Delta\lambda$, $\alpha$ is added to the wavelength $\lambda_2$ of the compensation-signal at a step S4. Then, when the deviation between this new $\lambda_2$ and the wavelength $\lambda_1$ of the input signal is checked to be more than the specific value $\Delta\lambda$ at a step S5, the flow returns to the step S1 and the controlling and the detecting is continued. When the deviation is less than the specific value $\Delta\lambda$, it is stopped to define a new $\lambda_2$ in the case of $\lambda_2$ becoming the same as a maximum limit $\lambda_0$. The system is checked at a step S7 and the controlling and the detecting is continued.

Since the output of the compensation-signal source is shut down by the isolator 7a, the output of the compensation-signal does not leak out of the optical amplifier, so that the output does not affect a transmission fiber system, another amplifier, a transmitter-receiver and so on.

Embodiment 6.

Figure 9:
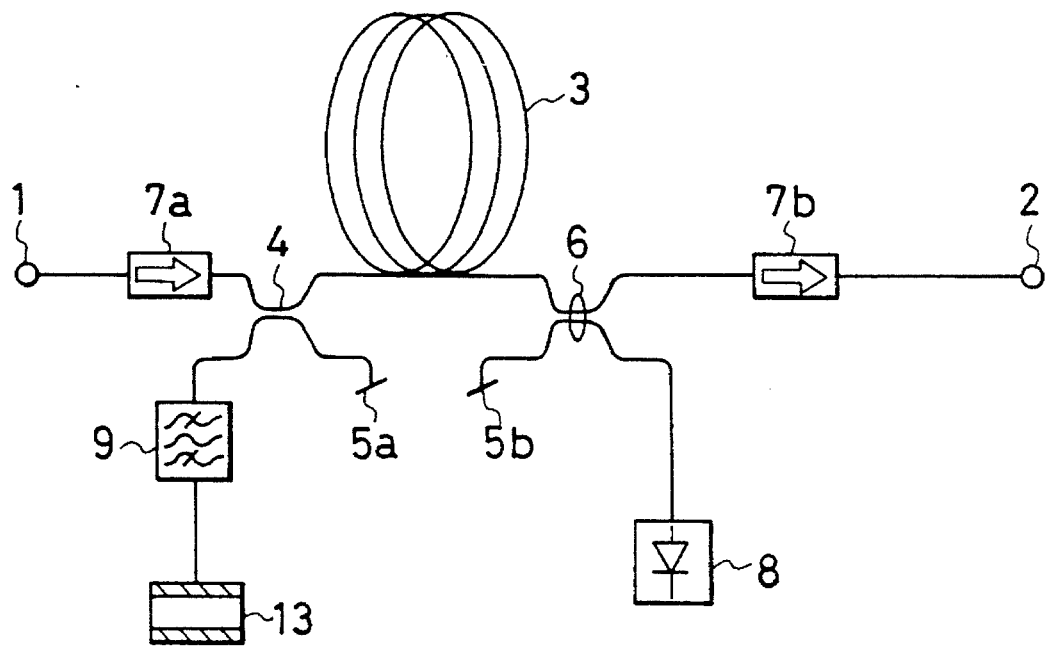
FIG. 9 shows a block diagram of configuration of an optical amplifier according to a sixth embodiment of the present invention.

FIG. 9 shows a block diagram of a configuration of another embodiment of the optical amplifier of the present invention. In FIG. 9, the input signal is entered through the input terminal 1 and output from the output terminal 2 via the isolator 7a, the coupler 4, the rare earth doped fiber 3, the WDM coupler 6 and the isolator 7b. An output of the pump-source 8 is input into the rare earth doped fiber 3 through the WDM coupler 6. Amplified-spontaneous-emission (ASE) output from the rare earth doped fiber 3 is input into the optical filter 9 through the coupler 4. A filtered ASE through the optical filter 9 selectively is input into the wavelength-selective reflector 13. A reflected ASE is input into the rare earth doped fiber 3 again via the optical filter 9 and the coupler 4. Unused terminals 5a and 5b of the coupler 4 and the WDM 6 are reflectionless terminations.

It is simple to operate the optical amplifier of this configuration. ASE generated in the rare earth doped fiber 3 by the pump-source 8, propagating contra-directionally with respect to the input signal, is separated at the coupler 4 and the optical filter 9 and reflected by the wavelength-selective reflector 13 for recycling. Namely, the ASE is used as the compensation-signal. Since the input signal is not reflected by the wavelength-selective reflector and a possibility of oscillating is low, so that a stabilized optical amplifier can be obtained.

Embodiment 7.

Figure 10:
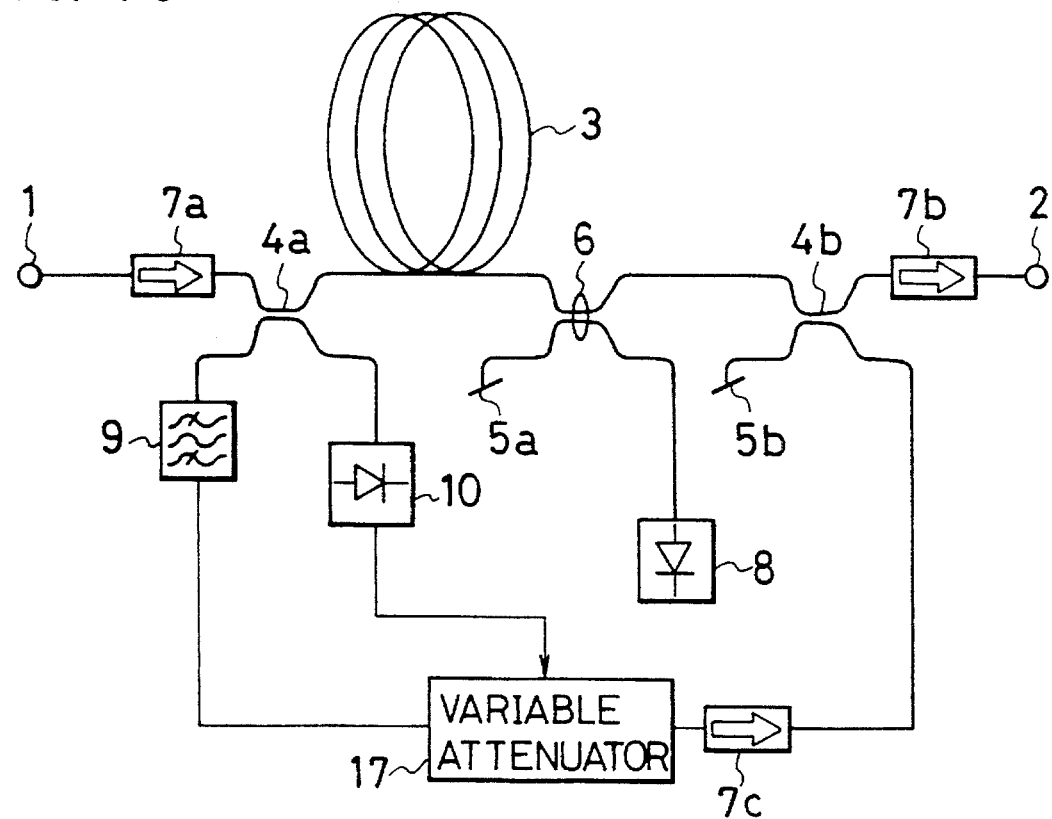
FIG. 10 shows a block diagram of configuration of an optical amplifier according to a seventh embodiment of the present invention.

FIG. 10 shows a block diagram of a configuration of another embodiment of the optical amplifier of the present invention. This embodiment differs from other embodiments in that the optical receiver 10 for detecting the power of the input signal and a variable attenuator 17 for controlling an attenuation based on the power of the input signal are provided. In FIG. 10, the input signal is entered through the input terminal 1 and output from the output terminal 2 via the isolator 7a, the coupler 4a, the rare earth doped fiber 3, the WDM coupler 6, the coupler 4b and the isolator 7b. An output of the pump-source 8 is input into the rare earth doped fiber 3 through the WDM coupler 6. The ASE output from the rare earth doped fiber 3 is input into the optical filter 9 through the coupler 4a and a filtered power of the ASE by the optical filter 9 selectively is input into the rare earth doped fiber 3 through the coupler 4b via the variable attenuator 17 and the isolator 7c. Power of the input signal is measured by the optical receiver 10 connected to the coupler 4a. Attenuation value of the variable attenuator is controlled based on an output of the optical receiver 10. Unused terminals of the coupler 4b and the WDM coupler 6 are reflectionless terminations 5a and 5b.

Operation of the optical amplifier of this configuration is as follows.

A part of the ASE propagating contra-directionally with respect to the input signal is extracted through the coupler 4a and the optical filter 9. The extracted light is used for stabilizing a gain of the optical amplifier as the compensation-signal. In the variable attenuator 17, a proper attenuation is applied based on the power of the input signal to prevent oscillation of the optical amplifier. Thus, the same effect as that of Embodiment 6 can be obtained in this embodiment. The optical receiver 10 and the variable attenuator 17 can be omitted, if necessary.

Embodiment 8.

Figure 11:
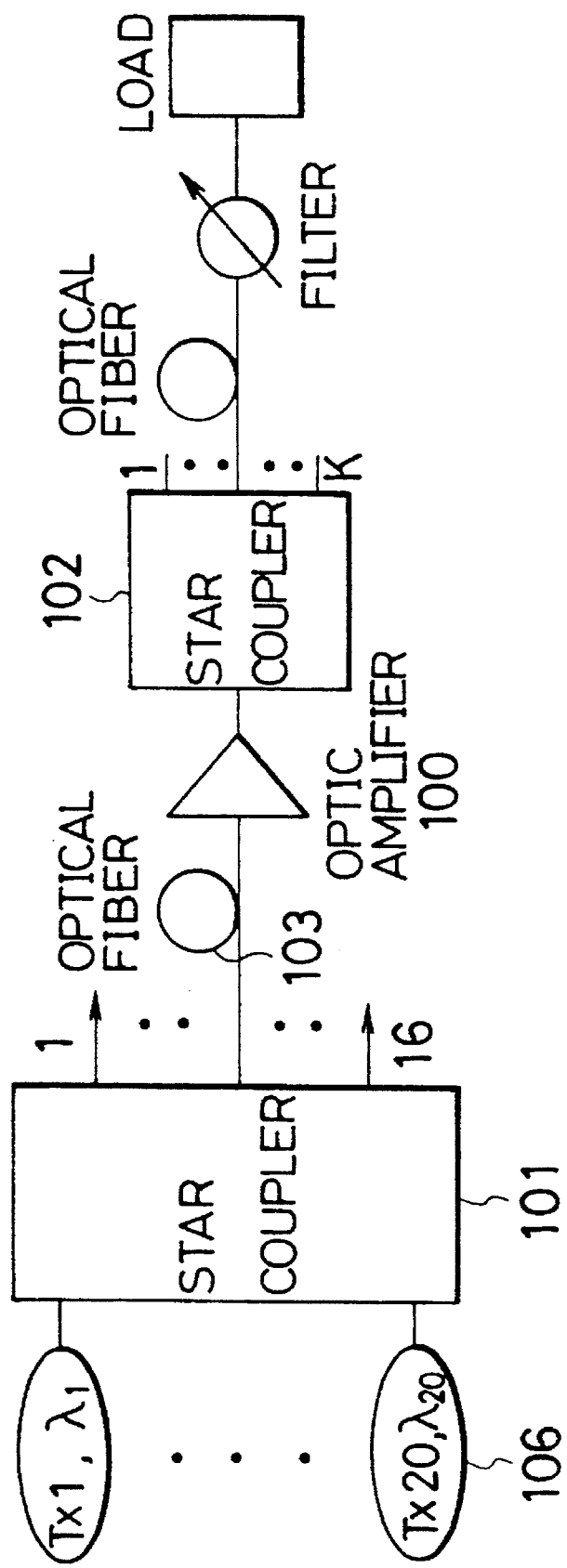
FIG. 11 shows a block diagram of a distribution system applying an optical amplifier of the present invention.

FIG. 11 is a system configuration diagram showing an embodiment of a distribution system applying the optical amplifier of the present invention. In FIG. 11, the optical amplifier 100 according to the present invention, star couplers 101 and 102 and an optical fiber 103 are provided.

The coupler 101 is coupled with inputs and outputs of a local area network (LAN) and so on. The coupler 102 is also coupled with a specific network. By using the optical amplifier according to the embodiment in a system connected with optical fiber cables, a correct signal can be transmitted even when the wavelength of signal changes largely and the power of signal changes enormously.

A transmitter 106 outputs lights of variable wavelengths. Since each transmitter outputs signals depends on necessity, the number of channels input into the optical amplifier 100 may change as time passes. Accordingly, when output power of each transmitter is constant, input power into the optical amplifier 100 can be variable. For instance, in a system of 100 ch, there is a possibility for the power to change 20 dB. When the input power changes 20 dB, output of the optical amplifier changes greatly. In the case of output of the optical amplifier changing, it is needed for a dynamic range in a receiver to be wide. However, it is not easy to provide a receiver whose dynamic range is wide. According to the embodiment, since the output power of the optical amplifier per input channel does not change, it is not necessary for the dynamic range of the receiver to be wide, which makes easy to construct the LAN.

Embodiment 9.

Figure 12:
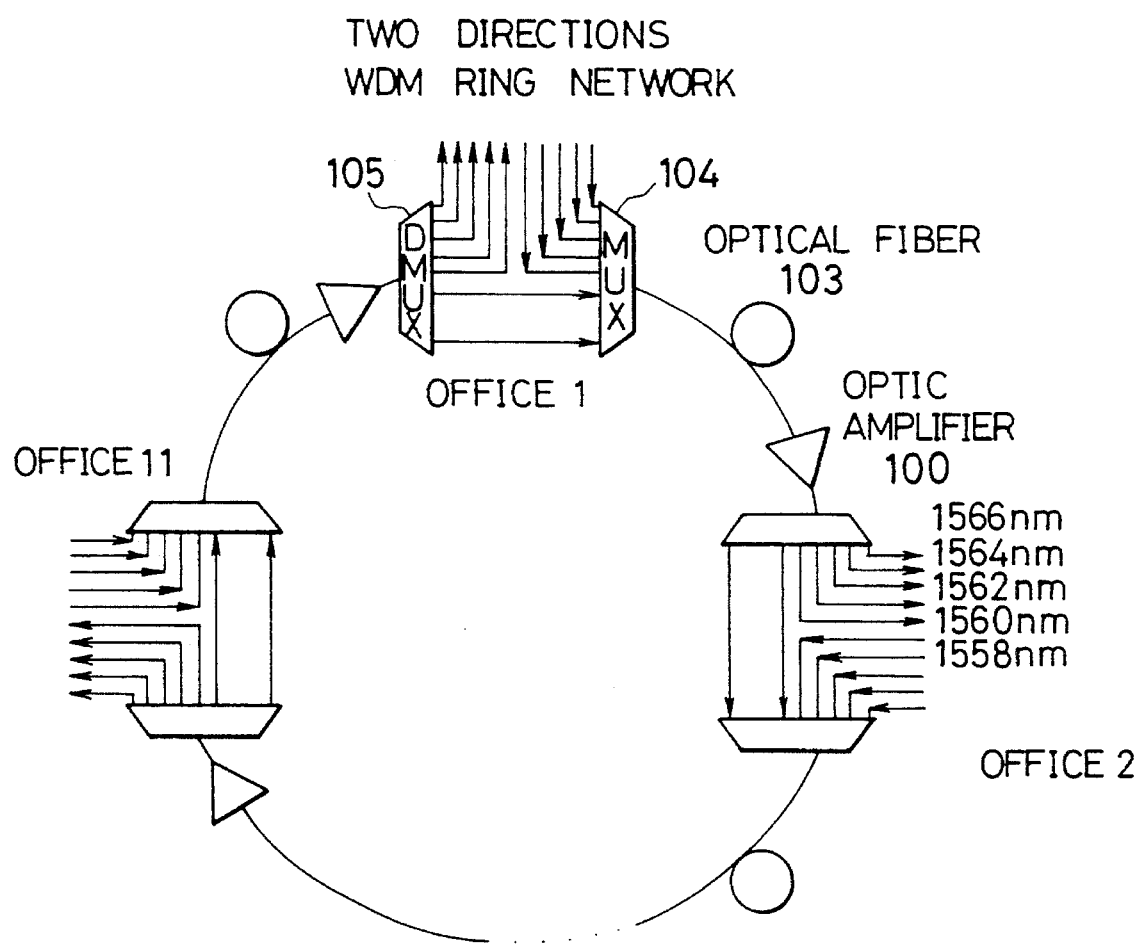
FIG. 12 shows a block diagram of LAN system applying an optical amplifier of the present invention.

FIG. 12 is a configuration showing an embodiment of the local area network (LAN) applying the optical amplifier of the present invention. In FIG. 12, the optical amplifier 100 according to the embodiment, an optical fiber cable 103, an optical multiplexer 104 and an optical demultiplexer 105 are provided.

By using the optical amplifier according to the embodiment in this system configuration, a signal can be transmitted properly as well as the embodiment 8. Accordingly, the same effect as the embodiment 8 can be obtained in this system.

Embodiment 10.

Figure 13A:
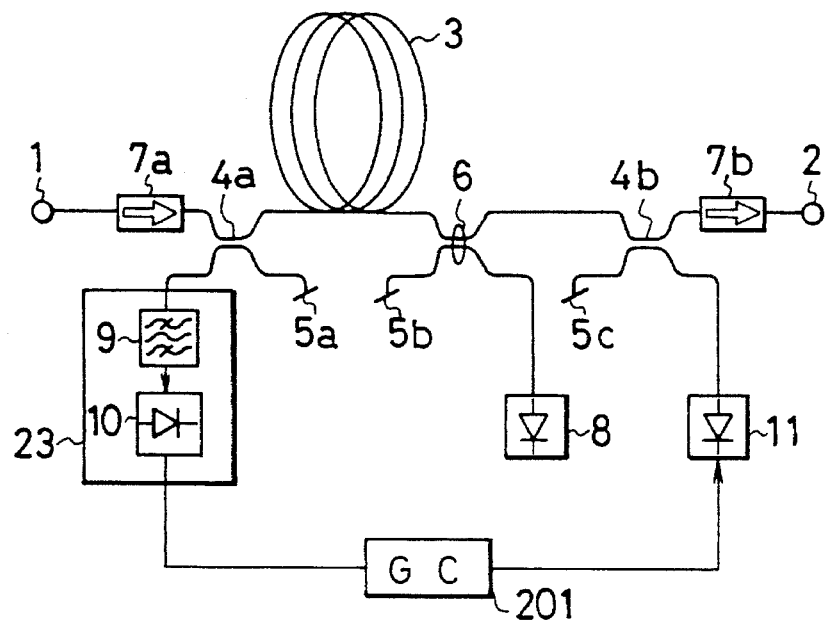
FIG. 13(a) shows a configuration for gain control for an optical amplifier of the present invention.

FIG. 13 shows a configuration of a gain controlling method and a flowchart of operation of the optical amplifier of the present invention. In FIG. 13(a), a gain controller 201 is composed of a microprocessor, a memory and an I/O controller.

Figure 13B:
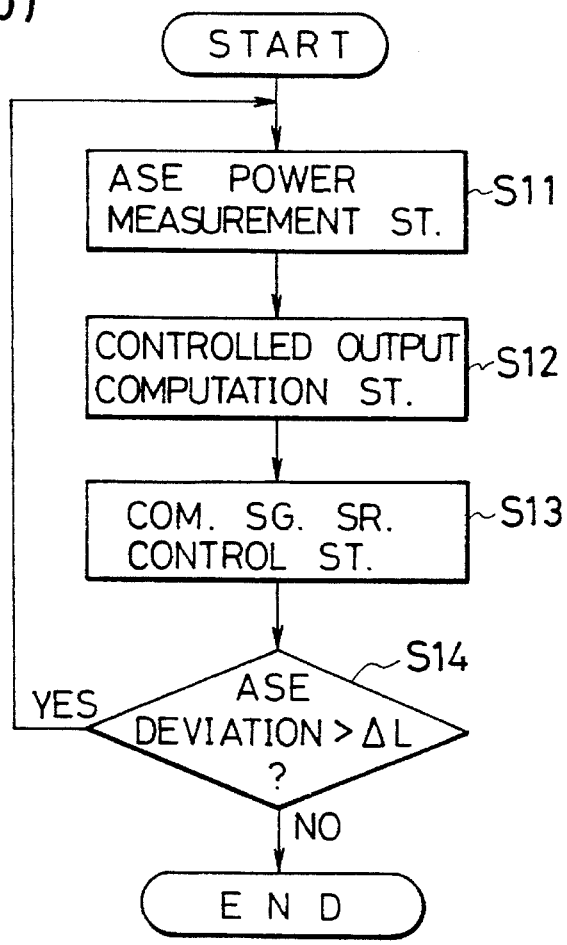
FIG. 13(b) shows a flowchart of operation of gain control for the configuration of FIG. 13(a)

Operation of the gain controller 201 in the optical amplifier of this configuration will now be explained with reference to the flowchart of FIG. 13(b). For instance, in the case of erbium-doped fiber, a time lag of the optical amplifier is on the order of 10 ms based on a life time at an energy level of $I_{13/2}$. Accordingly, it is sufficient for the gain controller to control at intervals of 1 ms or several ms.

When the switch is turned on, it is triggered periodically since then. At step S11, the ASE propagating in the optical fiber in the direction of the input side of rare earth doped fiber is filtered and measured. In this case, the wavelength of the ASE is anything but the wavelength of the input signal and the compensation-signal, so that the wavelength range of 15 nm can be filtered and measured, for instance.

Corresponding to the step S11, output of the compensation-signal source is defined based on a specific table or a specific computational procedure, at step S12.

The compensation-signal source propagating contra-directionally with respect to the input signal is controlled based on a value computed in the above step and the gain of the optical amplifier can be stabilized, at step S13.

When a measured deviation of the ASE becomes small, it is needed to wait for a next trigger. When the deviation of the ASE is still larger than a specific value ΔL, it is controlled further. Namely, the flow goes back to the step S11 from a step S14 for controlling.

Embodiment 11.

Figure 14A:
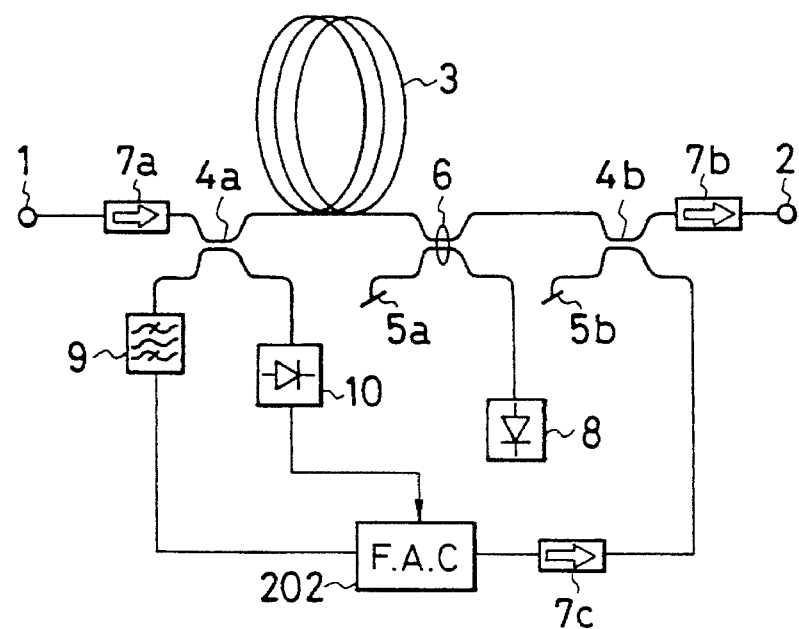
FIG. 14(a) shows a configuration for gain control for an optical amplifier of the present invention.

FIG. 14 shows a configuration of a attenuation control method and a flowchart of operation of the optical amplifier of the present invention. In FIG. 14(a), an attenuation controller 202 is composed of a microprocessor, a memory and an I/O controller.

Figure 14B:
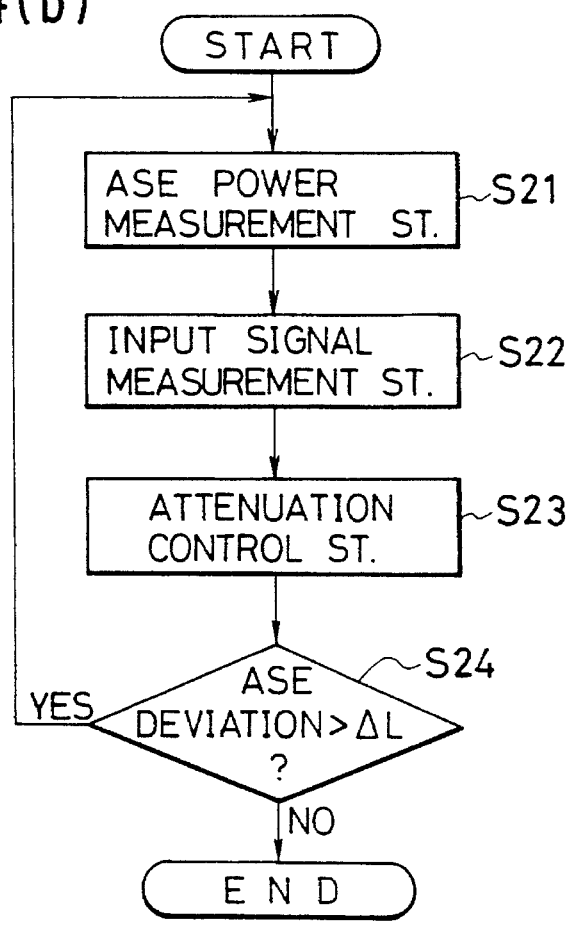
FIG. 14(b) shows a flowchart of operation of gain control for the configuration of FIG. 14(a)
Figure 15:
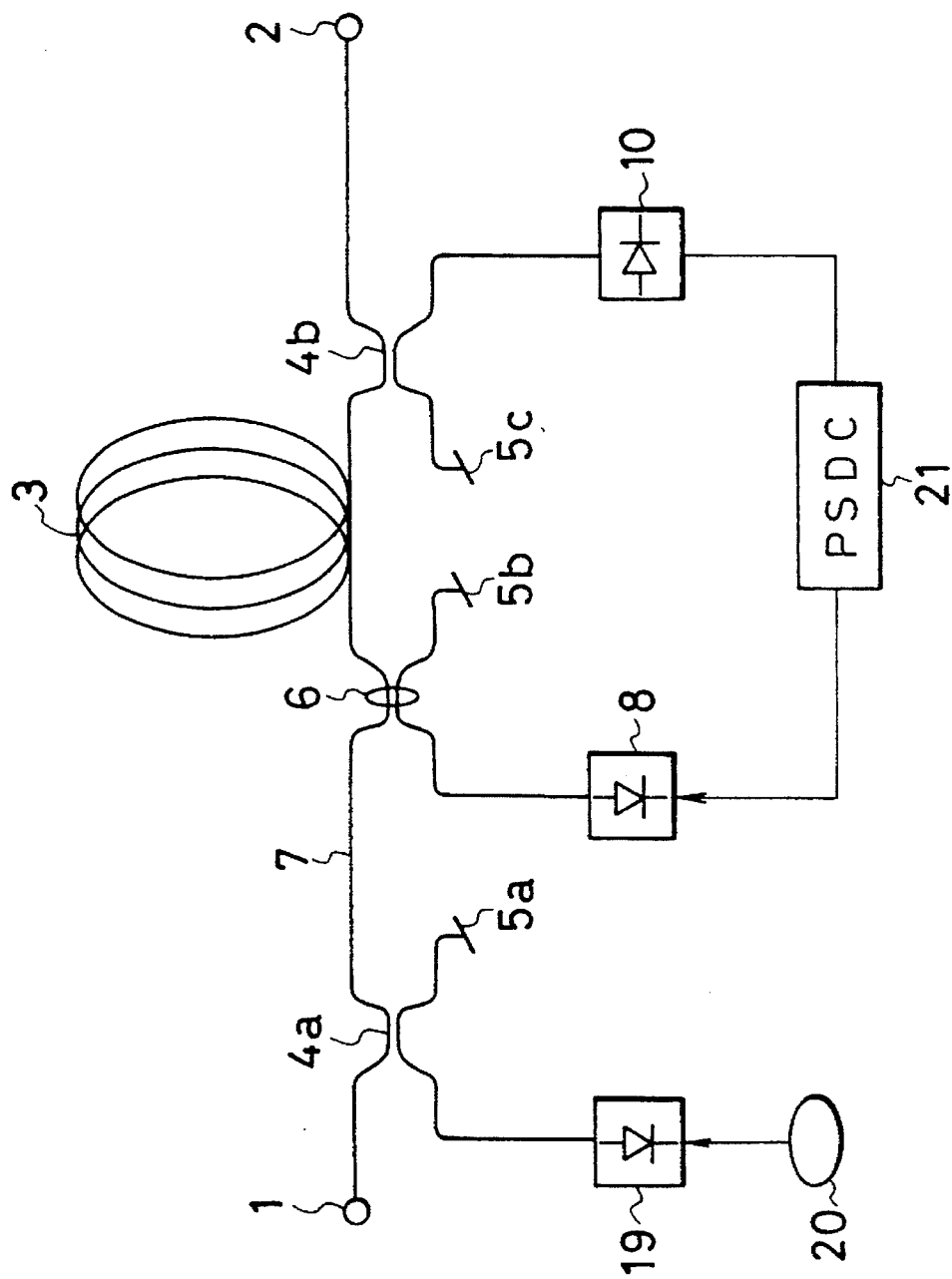
FIG. 15 shows a block diagram of configuration of an optical amplifier of Related Art.
Figure 16:
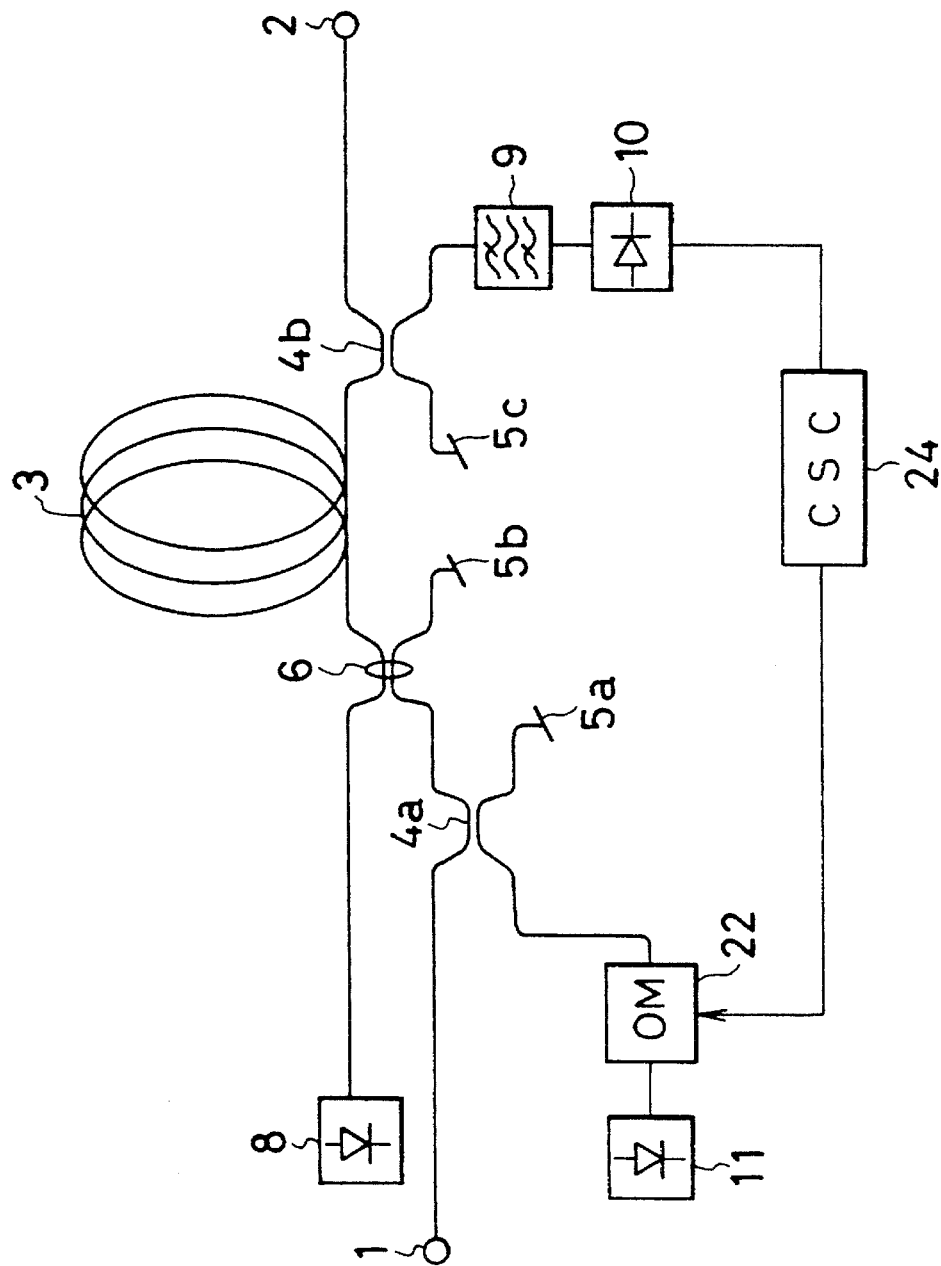
FIG. 16 shows another block diagram of configuration of an optical amplifier of Related Art.
Figure 17:
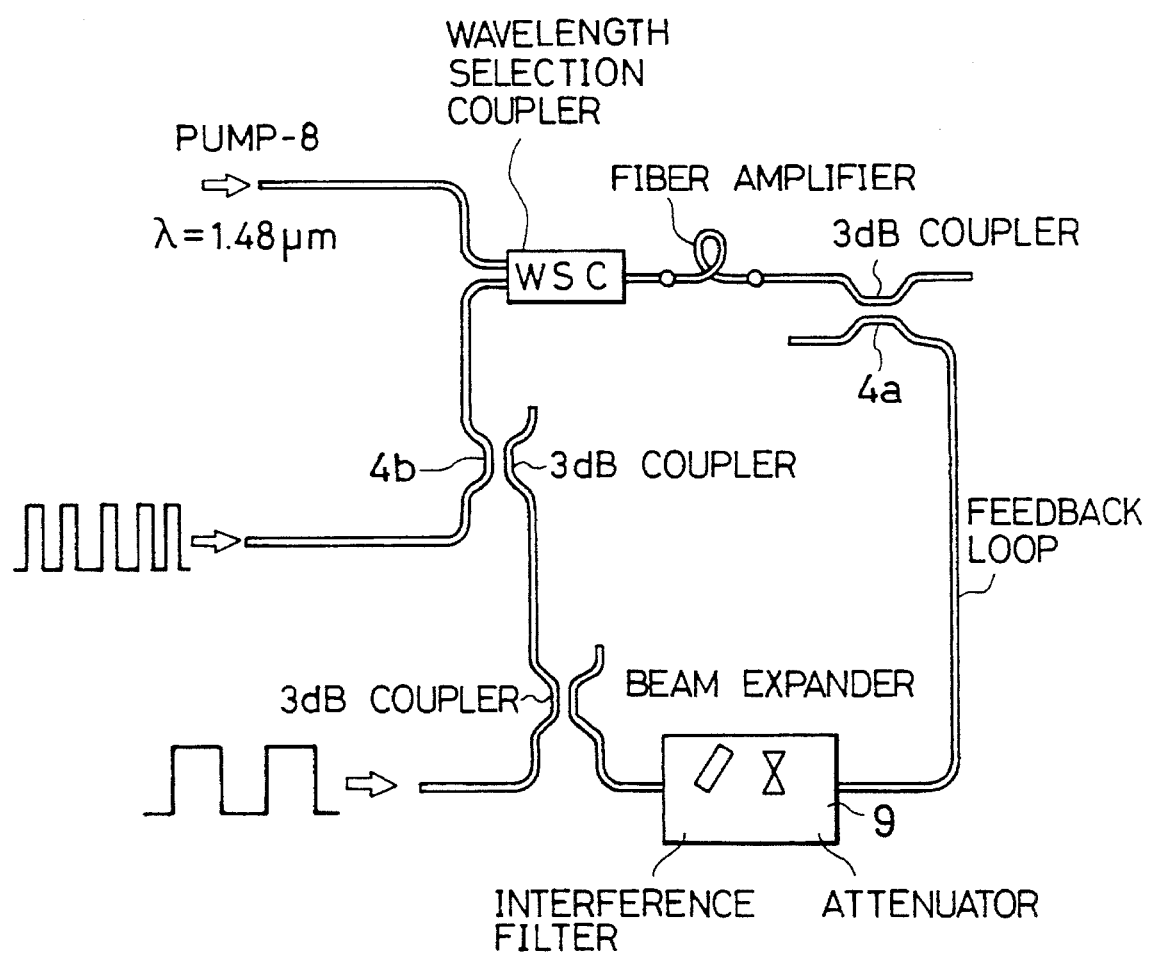
FIG. 17 shows another block diagram of configuration of an optical amplifier of Related Art.

Operation of the attenuation controller 202 in the optical amplifier of this configuration will now be explained with reference to the flowchart of FIG. 14(b). As described in the above embodiment, the time lag of the optical amplifier is 10 ms order, so that the attenuation controller can control at several ms intervals.

When the switch is turned on, it is triggered periodically since then. At step S21, a necessary part of the ASE propagating in the optical fiber in the direction of the input side of the rare earth doped fiber is filtered and measured.

Corresponding to the step S21, power of the input signal is measured at step S22. In step S23, attenuation of the ASE is controlled based on the input signal power. After being attenuated, necessary feedback amount of the ASE is injected contra-directionally with respect to the input signal. In the case of a deviation of the ASE being more than the specific value ΔL at step S24, the flow goes back to the step S21 for further controlling. Accordingly, the gain of the optical amplifier is stabilized.

Having described several embodiments, various alterations, modifications and improvements will readily occur to those skilled in the art. Such alterations, modifications and improvements are within the spirit and scope of the present invention. Accordingly, the foregoing description is by way of example only and not intended to be limiting. The invention is limited only as defined in the following claims and equivalents thereto.

What is claimed is:

1. An optical amplifier for amplifying a power of an input signal, comprising:

(A) a rare earth doped fiber having an input side and an output side, for amplifying the power of the input signal;

(B) a pump-source coupled to said output side of said rare earth doped fiber having an output propagating contra-directionally with respect to the input signal;

(C) a compensation-signal source coupled with the output side of the rare earth doped fiber having a compensation-signal propagating contra-directionally with respect to the input signal for compensating the power of the input signal;

(D) an optical receiver, coupled with the input side of the rare earth doped fiber, for measuring power of a propagating amplified-spontaneous-emission (ASE) generated by the pump-source in the rare earth doped fiber; and, (E) a compensation-signal controller for controlling power of the compensation-signal source in response to the measured power of the ASE.

2. The optical amplifier according to claim 1, wherein the compensation-signal source is controlled so that total power of the input signal and the compensation-signal is constant.

3. The optical amplifier according to claim 1, wherein a wavelength of the input signal and a wavelength of the compensation-signal are nearly equal.

4. The optical amplifier according to claim 1, wherein a wavelength of the input signal and a wavelength of the pump-source are nearly equal.

5. The optical amplifier according to claim 1, wherein the compensation-signal source is pulse width modulated.

6. The optical amplifier according to claim 1, further comprising an optical isolator at the input side of the rare earth doped fiber for isolating transmission of the compensation-signal.

7. The optical amplifier according to claim 1, further comprising a wavelength-selective reflector coupled with the input side of the rare earth doped fiber for reflecting the compensation-signal.

8. The optical amplifier according to claim 1, further comprising:
  a first wavelength detector for detecting a wavelength of the input signal;
  a second wavelength detector for detecting a wavelength of the compensation-signal; and
  wavelength controller, receiving the detected wavelengths from said first and second wavelength detectors, for controlling the wavelength of the compensation-signal so that it is different from the wavelength of the input signal.

9. An optical amplifier according to claim 1, further comprising:
  a modulator for modulating the compensation-signal source to produce a monitor signal in response to the output of the pump-source,
  wherein said compensation signal transmits said monitor signal to a previous optical element connected to said input side of said rare earth doped fiber.

10. An optical amplifier according to claim 1, further comprising:
  a modulator for modulating the compensation-signal source to produce a monitor signal in response to the measured power of the ASE,
  wherein said compensation-signal transmits said monitor signal to a previous optical element connected to said input side of said rare earth doped fiber.

11. An optical amplifier for amplifying a power of an input signal, comprising:
  (A) a rare earth doped fiber having an input side and an output side, for amplifying the power of the input signal;
  (B) a pump-source coupled to said output side of said rare earth doped fiber having an output propagating contra-directionally with respect to the input signal;
  (C) a compensation-signal source coupled with the input side of the rare earth doped fiber having a compensation-signal propagating co-directionally with respect to the input signal for compensating the power of the input signal;
  (D) an optical receiver, coupled with the input side of the rare earth doped fiber, for measuring power of a propagating amplified-spontaneous-emission (ASE) generated by the pump-source in the rare earth doped fiber;
  (E) a compensation-signal controller for controlling power of the compensation-signal source in response to the measured power of the ASE;
  (F) a modulator for modulating the compensation-signal source to produce a monitor signal,
  wherein said compensation signal transmits said monitor signal to a previous optical element connected to said input side of said rare earth doped fiber.

12. The optical amplifier according to claim 11, wherein said modulator produces the monitor signal in response to the power of the ASE.

13. The optical amplifier according to claim 9, wherein a wavelength of the compensation-signal is different from a wavelength of the input signal.

14. An optical amplifier for amplifying a power of an input signal, comprising:
  (A) a rare earth doped fiber having an input side and output side, for amplifying the power of the input signal;
  (B) a pump-source coupled to said output side of said rare earth doped fiber having an output propagating contra-directionally with respect to the input signal;
  (C) an optical receiver, coupled to the output side of the rare earth doped fiber, for measuring power of the input signal;
  (D) a filter coupled with the input side of the rare earth doped fiber for filtering a power of a propagating amplified-spontaneous-emission (ASE) generated by the pump-source; and
  (E) an attenuation controller for controlling an attenuation of the filtered power of the ASE in response to the measured power of the input signal, and for outputting the filtered power of the ASE after the attenuation to the output side of the rare earth doped fiber contra-directionally with respect to the output signal.

15. The optical amplifier according to claim 14, wherein a wavelength of the ASE is different from a wavelength of the input signal.

16. An optical amplifier for amplifying a power of an input signal, comprising:
  (A) a rare earth doped fiber having an input side and an output side, for amplifying the power of the input signal;
  (B) a pump-source coupled to said output side of said rare earth doped fiber having an output propagating contra-directionally with respect to the input signal;
  (C) a wavelength-selective reflector, coupled to the input side of the rare earth doped fiber, for reflecting a light having a specific wavelength as a compensation signal, and
  (D) a filter coupled to the input side of the rare earth doped fiber for selecting the compensation signal.

17. A distribution system comprising: (A) a first optical coupler for mixing original input signals, and for distributing the original input signals after mixing as a distributed input signal; (B) an optical amplifier connected to the first optical coupler for amplifying power of the distributed input signal, and for outputting the amplified input signal as an output signal, wherein the optical amplifier includes:
  (i) a rare earth doped fiber having an input side and an output side, for amplifying the power of the input signal;
  (ii) a pump-source coupled to said output side of said rare earth doped fiber having an output propagating contra-directionally with respect to the input signal;
  (iii) a compensation-signal source coupled with the output side of the rare earth doped fiber having a compensation-signal propagating contra-directionally with respect to the input signal for compensating the power of the input signal;

(iv) an optical receiver, coupled with the input side of the rare earth doped fiber, for measuring power of a propagating amplified-spontaneous-emission (ASE) generated by the pump-source in the rare earth doped fiber; and (v) a compensation-signal controller for controlling power of the compensation-signal source in response to the measured power of the ASE; and (C) a second optical coupler coupled to the optical amplifier for mixing and distributing the output signal.

18. A local area network system comprising:

(A) a first optical coupler for mixing original input signals from previous local area networks, and for distributing the mixed input signals;

(B) an optical amplifier connected to the first optical coupler for amplifying a power of the distributed input signals, and for outputting the amplified input signals as an output signal, wherein the optical amplifier includes:

(i) a rare earth doped fiber having an input side and an output side, for amplifying the power of the input signal;

(ii) a pump-source coupled to said output side of said rare earth doped fiber having an output propagating contra-directionally with respect to the input signal;

(iii) a compensation-signal source coupled with the output side of the rare doped fiber having a compensation-signal propagating contra-directionally with respect to the input signal for compensating the power of the input signal;

(iv) an optical receiver, coupled with the input side of the rare earth doped fiber, for measuring power of a propagating amplified-spontaneous-emission (ASE) generated by the pump-source in the rare earth doped fiber; and (v) a compensation-signal controller for controlling power of the compensation-signal source in response to the measured power of the ASE; and (C) a second optical coupler for mixing the output signals of the optical amplifier, and for distributing each of the mixed output signals to a next local area network.

19. A method for controlling amplification of an optical amplifier using a rare earth doped fiber pumped by constant output of a pump-source propagating contra-directionally with respect to the input signal, comprising the steps of:

(A) measuring a power of a propagating amplified-spontaneous-emission (ASE) generated by the pump-source in the rare earth doped fiber at an input side of the rare earth doped fiber;

(B) computing a value for power of a compensation-signal based on a measured power of the ASE;

(C) controlling power of the compensation-signal charged contra-directionally with respect to the input signal based on the value computed in the computation step (B); and (D) repeating the steps (A), (B) and (C) if deviation of the measured ASE power from a target ASE power exceeds a predetermined value.

20. The method of claim 19, wherein the computation step includes using a table between the power of ASE and the power of the compensation-signal.

21. The method of claim 19, wherein the steps are performed periodically.

22. The method of claim 19 further including the steps of:

detecting a wavelength of the input signal, and controlling a wavelength of the compensation-signal so that it is different from that of the input signal.

23. A method for controlling amplification of an optical amplifier for an input signal, using a rare earth doped fiber having an input side and an output side pumped by constant output of a pump-source propagating contra-directionally with respect to the input signal, comprising the steps of:

(A) measuring a power of a propagating amplified-spontaneous-emission (ASE) generated by the pump-source in the rare earth doped fiber at the input side of the rare earth doped fiber;

(B) measuring a power of the input signal;

(C) controlling attenuation of the ASE based on the measured power of the input signal;

(D) outputting said attenuated ASE to the output side of said rare earth doped fiber contra-directionally with respect to said input signal ASE; and (E) repeating the steps (A), (B), (C) and (D) if deviation of said measured ASE power from a target ASE power exceeds the predetermined value.

24. The method of claim 23, wherein the steps (A) to (E) are performed periodically.

25. The optical amplifier according to claim 11, wherein said modulator produces the monitor signal in response to the power of the pump-source.

26. The optical amplifier according to claim 11, wherein a wavelength of the compensation-signal is different from a wavelength of the input signal.

27. An optical amplifier for amplifying an input signal comprising:

(A) a rare earth doped fiber having an input side and an output side, for amplifying the power of the input signal;

(B) pump-source means for generating an amplified-spontaneous-emission (ASE) contra-directionally with respect to the input signal; and (C) compensation-signal means coupled to the rare earth doped fiber for compensating power of the input signal in response to power of the ASE, wherein said compensation-signal means includes means for measuring power of said ASE.

28. The optical amplifier of claim 27, wherein said measuring means includes an optical receiver.

29. The optical amplifier of claim 27, wherein said compensation-signal means includes a filter for filtering means for controlling the wavelength of said compensation-signal when the wavelength of said input signal is substantially equal to the wavelength of said compensation-signal.

30. The optical amplifier of claim 27, wherein said compensation-signal means includes a compensation-signal source connected to the output side of the rare earth doped fiber for propagating a compensation-signal contra-directionally with respect to the input signal.

31. The optical amplifier of claim 30, further comprising a controller for controlling power of said compensation-signal source.

32. The optical amplifier of claim 31, wherein said controller includes pulse width modulated control.

33. The optical amplifier of claim 30, wherein said compensation-signal has a wavelength different than said input signal.

34. The optical amplifier of claim 33, further comprising:

means for detecting the wavelength of said input signal, means for detecting the wavelength of said compensation-signal, and means for controlling the wavelength of said compensation-signal when the wavelength of said input signal is substantially equal to the wavelength of said compensation-signal.

35. The optical amplifier of claim 27, further comprising reflection means coupled to the input of said rare earth doped fiber for reflective selected wavelengths co-directionally with respect to said input signal.

36. The optical amplifier of claim 35, wherein said reflection means reflects wavelengths corresponding to said compensation-signal.

37. The optical amplifier of claim 27, further comprising modulation means for modulating said compensation-signal means to produce a monitor signal.

38. The optical amplifier of claim 37, wherein said modulation means modulates said compensation-signal means based upon power of said pump-source means.

39. The optical amplifier of claim 37, wherein said modulation means modulates said compensation-signal means based upon power of said ASE.

40. The optical amplifier of claim 37, wherein said compensation-signal means propagates a compensation-signal through said rare earth doped fiber contra-directionally with respect to the input signal.

41. An optical amplifier for amplifying an input signal comprising:

(A) a rare earth doped fiber having an input side and an output side, for amplifying the power of the input signal;

(B) pump-source means for generating an amplified-spontaneous-emission (ASE) Contra-directionally with respect to the input signal; and (C) compensation-signal means coupled to the rare earth doped fiber for compensating power of the input signal in response to power of the ASE, wherein said compensation means includes:

(D) filter means coupled to the input side of the rare earth doped fiber for filtering said ASE; and reflecting means for reflecting said filtered ASE through rare earth doped fiber co-directionally with respect to said input signal.

42. The optical amplifier of claim 41, wherein said reflecting means includes a wavelength-selective reflector.

43. A method for controlling amplification of an optical amplifier using a rare earth doped fiber comprising the steps of:

generating an amplified-spontaneous-emission (ASE) through said rare earth doped fiber contra-directionally with respect to an input signal; and controlling a compensation-signal source to compensate the power of the input signal in response to power of the ASE, wherein said controlling step includes a step of measuring power of said ASE.

44. The method of claim 43, wherein said controlling step includes the step of propagating a compensation-signal contra-directionally with respect to the input signal.

45. The method of claim 44, wherein said compensation-signal has a wavelength different than said input signal.

46. The method of claim 45, further comprising the steps of:

detecting the wavelength of said input signal, detecting the wavelength of said compensation-signal, and controlling the wavelength of said compensation-signal when the wavelength of said input signal is substantially equal to the wavelength of said compensation-signal.

47. The method of claim 44, wherein said controlling step includes reflecting said compensation-signal co-directionally with respect to said input signal.

* * * * *